United States Patent [19]  [11] 3,966,844
Arrighetti et al.  [45] June 29, 1976

[54] POLYMERIC MATERIAL HAVING IMPACT RESISTANT PROPERTIES AND PROCESS FOR THE PREPARATION THEREOF

[75] Inventors: Sergio Arrighetti, Milan; Aldo Brancaccio, Cremona; Sebastiano Cesca; Gianpaolo Giuliani, both of San Donato Milanese, all of Italy

[73] Assignee: Snam Progetti S.p.A., San Donato Milanese, Italy

[22] Filed: Oct. 31, 1974

[21] Appl. No.: 519,799

[30] Foreign Application Priority Data

Oct. 31, 1973  Italy .................................. 30786/73

[52] U.S. Cl. ............................................. 260/878 R
[51] Int. Cl.² ................. C08L 23/16; C08L 23/08; C08F 255/06; C08F 255/02
[58] Field of Search ............................... 260/878 R

[56] References Cited

UNITED STATES PATENTS

| 3,483,273 | 12/1969 | Prucnal et al. ................... 260/878 R |
| 3,489,822 | 1/1970 | Witt et al. ......................... 260/878 R |
| 3,892,712 | 7/1975 | Arrighetti et al. .............. 260/878 R |

Primary Examiner—Alan Holler
Attorney, Agent, or Firm—Ralph M. Watson

[57] ABSTRACT

A polymeric material having high impact resistance and improved resistance to ageing is prepared by grafting monomers such as acrylonitrile and styrene upon a rubbery terpolymer of ethylene, an alpha-olefin such as propylene and a triene termonomer such as 2-(1' or 2' or 3' methyl-1' or 2' or 3' cyclopenta-2' or 4' dienyl) norborn-5-enyl-methane, containing from 0.1 to 20 pairs of conjugate double bonds per thousand carbon atoms in the polymer chain.

4 Claims, No Drawings

POLYMERIC MATERIAL HAVING IMPACT RESISTANT PROPERTIES AND PROCESS FOR THE PREPARATION THEREOF

The present invention relates to the preparation of polymeric materials having a high impact resistance, containing particular rubbery terpolymers which give them better properties.

It is known that the common shock-resistant materials, which are now on sale, obtained by polymerizing mixtures of aromatic and acrylic monomers such as styrene and acrylonitrile on polybutadiene suffer the drawback of turning brittle under the action of air and light.

It is also known that this tendency to ageing can be reduced by employing, as the elastomeric phase, rubbers having a lower unsaturation content, such as EPDM (B. Pat. No. - 1,103,438 - B. Pat. No. 1,067,810).

This is obtained by interpolymerizing styrene and acrylonitrile on the elastomer according to various processes and techniques: emulsion, suspension, solution (U.S. Pat. No. 3,538,192 - U.S. Pat. No. 3,538,190).

A remarkable drawback, however, in the preparation of these resins results from the fact that the low unsaturation content, responsible for the good resistance to ageing, limits the grafting reaction of the resin on the rubber and, as a consequence, they do not usually succeed in obtaining the necessary degree of compatibility with the resinous matrix, unless use is made of rubbery terpolymers containing particular termonomers and a relatively high termonomer content (8–10% by weight). (According to the matter reported at meeting of Rubber Chemistry, American Chemical Society, Miami Beach, Florida - Apr. 27 – 30, 1971).

This gives rise to two drawbacks: the cost and the properties of the resin which contains residual unsaturations and, therefore, is subject to an ageing.

Now we have surprisingly found that, if the grafting reaction of monomers such as acrylonitrile-styrene etc. on rubber is carried out by employing a particular type of ethylene-propylene-triene monomer base rubbery terpolymer, very high grafting yields are obtained even when use is made of low termonomer amounts on the rubber and plastic materials are isolated having very good shock-resistant properties also at low rubber content. Moreover the properties of these polymeric materials, obtained by employing the aforesaid rubbery terpolymers, are unchanged also after an accelerated ageing.

The terpolymers used according to the present invention are the ones having, in the chain, pairs of conjugated double bonds and derived from the copolymerization of ethylene, an alphaolefin and a third monomer containing, besides a double bond which is engaged in the polymerization, at least a pair of conjugated double bonds which enters as such the polymer chain.

These terpolymers and the methods of preparation thereof have been described in patents owned by the assignee of this application, for instance in Italian Pat. Nos. 753,804 – 813,867 – 843,706 – 851,691 – 851,691–851,694 – 864,061 – 885,567 – 885,568 – 885,727 – 885,729.

The monomers, usable as such or in admixture with one another, for preparing these particular products by grafting on the terpolymer are:

a - alkenyl aromatic monomers such as styrene, alphamethyl-styrene, alpha-alkyl-styrene, chlorostyrene and, generally, substituted styrenes, vinyl-naphthalene and substituted vinyl-napthalenes;

b - vinyl- or vinylidene halides such as vinyl chloride and vinylidene chloride;

c - acrylic monomers having the general formula

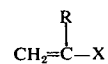

in which R is hydrogen or an alkyl group having from 1 to 5 carbon atoms and X is selected from

R' being an alkyl group containing from 1 to 9 carbon atoms.

The above listed monomers may be used in a suitable mixture and copolymerized at the same time on the elastomeric phase.

Unrestrictive examples advantageously employable according to the present invention are the ones obtained by polymerizing ethylene, propylene and a monomer selected from:

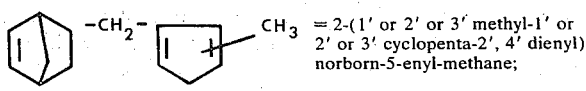
= 2-(1' or 2' or 3' methyl-1' or 2' or 3' cyclopenta-2', 4' dienyl) norborn-5-enyl-methane;

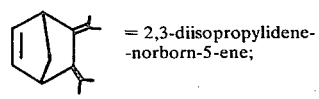
= 2,3-diisopropylidene-norborn-5-ene;

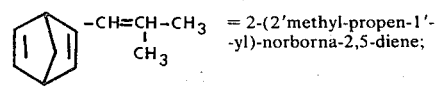
= 2-(2'methyl-propen-1'-yl)-norborna-2,5-diene;

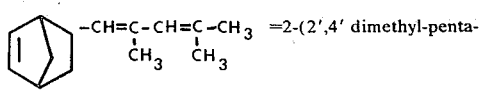
= 2-(2',4' dimethyl-penta-

-continued

-1',3'-dienyl) norborn--5-ene;

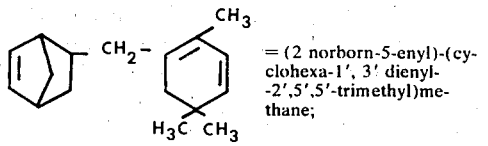 = (2 norborn-5-enyl)-(cyclohexa-1', 3' dienyl--2',5',5'-trimethyl)methane;

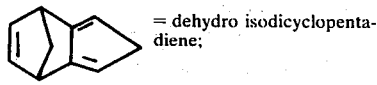 = dehydro isodicyclopentadiene;

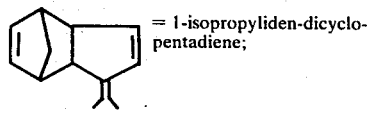 = 1-isopropyliden-dicyclopentadiene;

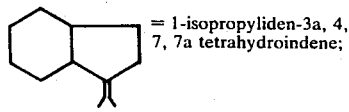 = 1-isopropyliden-3a, 4, 7, 7a tetrahydroindene;

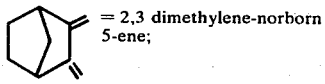 = 2,3 dimethylene-norborn 5-ene;

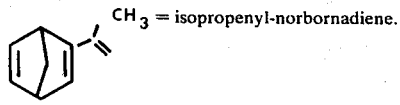 = isopropenyl-norbornadiene.

Moreover use may be made of the terpolymers obtained from the alkyl and polyalkyl derivatives of the aforesaid monomers.

These terpolymers may contain from 0.1 to 10% by weight of termonomer and preferably from 0.5 to 5%.

EXAMPLE 1

A three necked flask having a 2 liter capacity and provided with a reflux condenser and a stirrer was loaded with 20g. of a terpolymer constituted by ehtylene-propylene and 2-(1' or 2' or 3' methyl-1' or 2' or 3' cyclopenta-2', 4' dienyl) norborn-5-enyl-methane having the following characteristics:

- $C_2H_4$ = 61% by weight

- $[\Gamma]_{toluene}^{30°C}$ = 1.9 dl/g

- $\frac{\text{Pairs of conjugated double bonds}}{1000 \text{ Catoms}}$ = 2.15

360 g. of a mixture constituted by 50 parts by weight of hexane and 50 parts of benzene were added and the whole was stirred at room temperature till all polymer had passed into solution.

To the terpolymer solution there was then added 1.4g. of benzoyl peroxide, 116g. of styrene, 40g. of acrylonitrile and it was reacted over 20 hours at 70°C, under a nitrogen atmosphere.

The reaction product was precipitated in 3 liters of isopropyl alcohol, filtered and the resin was dried at room temperature under vacuum.

166 g. of resin were obtained, that meant acrylonitrile and styrene reacted to the extent of 93%.

The analyses carried out on the resins showed that they were a mixture of styrene-acrylonitrile copolymer and terpolymer on which styrene-acrylonitrile chains were grafted. The grafting rate, expressed as $$\frac{\text{grams of resin grafted on the terpolymer}}{\text{grams of terpolymer}} \cdot 100 = 130$$

EXAMPLE 2

This test was carried out according to the conditions described in U.S. Pat. No. 3,538,190 example 12 (test No. 1), by employing an ethylidene-norbornene base rubbery terpolymer, having the characteristics disclosed in the patent.

Accelerated ageing tests were carried out on the obtained resin which, for the sake of comparison with the resins of the present invention, are reported in table No. 2.

EXAMPLE 3

This test was carried out according to the conditions described in U.S. Pat. No. 3,538,190, example 12 (test No. 19), by employing an ethylidene-norbornene base rubbery terpolymer having the characteristics disclosed in the patent.

Accelerated ageing tests were carried out on the obtained resin which are reported in table No. 2 for the sake of comparison with the resins of the present invention.

EXAMPLE 4

According to the same working procedure as example 1, the reaction was performed by using a solution of a terpolymer formed by ethylene-propylene and dimethylcyclopentadienyl-2-norborn-5 enylmethane having the following characteristics:

- $C_2H_4 = 60\%$ by weight

- $[\Gamma]$ 30°C 1.86 dl/g

- $\frac{\text{conjugated double bonds}}{1000 \text{ C atoms}} = 2.2$ 168 g. of resins were obtained, that meant acrylonitrile and styrene reacted to the extent of 95%. The grafting rate was 160.

The characteristics of the obtained resin are reported in table 1 and in table 2.

EXAMPLE 5

The conditions of example 1 were followed but the terpolymer, which was constituted by ethylene, propylene and cyclopentadienyl-2-norborn-5 enyl-methane, having the following characteristics:

- $C_2H_4 = 59\%$ by weight

- $[\Gamma] \frac{30°C}{\text{toluene}} = 2.05$ dl/g

- $\frac{\text{conjugated double bonds}}{1000 \text{ C atoms}} = 2.6$ 160 g. of resin were obtained at a 90% conversion. The grafting rate was 60.

The characteristics of the obtained resin are reported in table 1.

EXAMPLE 6

The same procedure as example 1 was followed but the rubbery polymer was formed by ethylene-propylene-dimethylcyclopentadienyle-2 norborn-5 enyl-methane, having the characteristics described in example 4 and the benzene-hexane mixture was substituted by 540 cc of hexane.

167 g. of resin were obtained which meant acrylonitrile and styrene reacted for 94%. The grafting rate was 80. The properties of the isolated product are reported in table 1.

EXAMPLE 7

By following the same working conditions as example 1 and using the polymer employed in example 4, the rubber was dissolved in 540 cc of benzene.

140 g. of product were obtained which meant a monomer conversion of 77%. The grafting rate was 150.

The properties of the isolated product are reported in table 1.

EXAMPLE 8

According to the same working conditions as example 1 the reaction was performed starting from a solution of terpolymer constituted by ethylene-propylene-1-isopropylidene-dicyclopentadiene, having the following characteristics:

- $C_2H_4 = 60\%$ by weight

- $[\Gamma] \frac{30°C}{\text{toluene}} 1.8$

- $\frac{\text{conjugated double bonds}}{1000 \text{ C}} = 2.5$ 168 g. of resin were obtained which meant the monomer conversion was 95%. The grafting rate was 58.

The properties of the isolated resins are reported in tables 1 and 2.

EXAMPLE 9

The conditions of example 1 were followed by using a benzene solution containing 5.2% by weight of a rubbery terpolymer constituted by ethylene-propylene-2-(2',4'-dimethyl-penta-1', 3'-dieny) norborn-5-ene having the following characteristics:

- $C_2H_4 = 60\%$ by weight

- $[\Gamma] \frac{30°C}{\text{toluene}} = 1.95$ dl/g

- $\frac{\text{double bonds}}{1000 \text{ C}} = 1.7$ 160 g. of resin were obtained, having the characteristics reported in tables 1 and 2.

EXAMPLE 10

The working formalities of example 1 were followed by starting with a toluene solution containing 5% by weight of a terpolymer constituted by ethylene, propylene and (2-norborn-5 enyl)-(cyclohexa-1', 3'-dienyl-2', 5', 5' trimethyl) methane having the following characteristics:

- $C_2H_4 = 62\%$ by weight

- $[\Gamma] \frac{\text{toluene}}{30°C} = 2.1$ dl/g

- $\frac{\text{conjugated double bonds}}{1000 \text{ C}} = 2.1$ 163 g. of resin were obtained, having the characteristics reported in tables 1 and 2.

EXAMPLE 11

The same conditions as example 1 were followed but the rubbery terpolymers, constituted by ethylene, propylene, 1-isopropyliden-3a, 4, 7, 7a-tetrahydroindene having the following characteristics:

- $C_2H_4 = 61\%$ by weight
- $[\Gamma]\dfrac{\text{toluene}}{30°C} = 1.75$ dl/g
- $\dfrac{\text{conjugated double bonds}}{1000\ C} = 2.8$ 165 g. of resin were obtained which meant that styrene and acrylonitrile reacted to the extent of 93%.

The characteristics of the resin are reported in tables 1 and 2.

EXAMPLE 12

A three necked flask having 2 l. capacity and provided with a reflux condenser and a stirrer was loaded with 20 g. of a terpolymer constituted by ethylene-propylene-dehydroisodicyclopentadiene having the following characteristics:

- $C_2H_4 = 63\%$ by weight
- $[\Gamma]\dfrac{30°C}{\text{toluene}} = 2.3$ dl/g
- $\dfrac{\text{conjugated double bonds}}{1000\ C} = 0.5$ 350 g. of hexane were added and the whole was stirred at room temperature till all polymer had passed into solution.

To the terpolymer solution was then added 1.4 g. of benzoyl peroxide, 150 g. of styrene and reacted over a period of 2 hours at 70°C under a nitrogen atmosphere. 130 g. of resin were obtained having the characteristics reported in table 1.

EXAMPLE 13

An autoclave having 2 l. capacity, from which air was removed by repeated vacuum-nitrogen operations, was loaded with 350 g. of a benzene solution containing 5.7% of a terpolymer constituted by ethylene-propylene-2,3 dimethylene norborn-5-ene having the following characteristics:

- $C_2H_4 = 58\%$ by weight
- $[\Gamma]\dfrac{30°C}{\text{toluene}} = 1.61$ dl/g
- $\dfrac{\text{conjugated double bonds}}{1000\ C} = 2.9$ To the solution was added 1.5 g. of benzoyl peroxide and 200 g. of vinyl chloride. The whole was brought to 70°C under

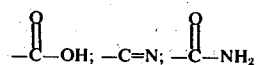

over a period of 16 hours. 170 g. of resin were obtained, having the characteristics reported in table 1.

EXAMPLE 14

350 g. of a benzene solution containing 5.7% of a terpolymer constituted by ethylene-propylene-2-(2',4'-dimethylpenta-1',3' dienyl)-norborn-5-ene having the following characteristics:

- $C_2H_4 = 60\%$ by weight
- $[\Gamma]\dfrac{30°C}{\text{toluene}} = 2$ dl/g
- $\dfrac{\text{conjugated double bonds}}{1000\ C} = 1.9$ were treated, according to the formalities of example 1, with 150 g. of methyl methacrylate.

120 g. of resin were obtained having the characteristics reported in table 1.

TABLE 1

| Example | Characteristics of the resins obtained in examples: | | | | | | | | | | | |
|---|---|---|---|---|---|---|---|---|---|---|---|---|
| | 1 | 4 | 5 | 6 | 7 | 8 | 9 | 10 | 11 | 12 | 13 | 14 |
| Izood-impact property kg/cm² | 35 | 48 | 25 | 30 | 43 | 23 | 50 | 33 | 25 | 25 | 65 | 15 |
| Rockwell hardness | 108 | 107 | 106 | 108 | 104 | 108 | 108 | 111 | 93 | 110 | 77 | — |
| Bending modulus (E) (kg/cm²) | 25,000 | 24,000 | 22,900 | 23,500 | 23,000 | 24,200 | 23,800 | — | 23,100 | 25,000 | 20,000 | — |
| Traction $C_{max}$ (kg/cm²) | 351 | 320 | 240 | 240 | 290 | 250 | — | — | 230 | — | — | — |
| $G = \dfrac{St+An.100}{\text{rubber}}$ | 130 | 160 | 60 | 80 | 150 | 58 | 130 | 75 | 60 | — | — | — |

TABLE 2

Accelerated ageing in ATLAS DMC-R-Weatherometer
Percentage relative variation of Izood Impact (U.I.); yellowness index variation (Y.I.)

| examples | 1 | | 2 | | 3 | | 4 | | 8 | | 9 | | 10 | | 11 | |
|---|---|---|---|---|---|---|---|---|---|---|---|---|---|---|---|---|
| Time (h) | UI | YI | UI | YI | UI | YI | UI | YI | UI | YI | UI | YI | UI | YI | UI | YI |
| 0 | 100 | 18 | 100 | 20 | 100 | 18 | 100 | 20 | 100 | 17 | 100 | 23 | 100 | 35 | 100 | 25 |
| 150 | 94 | 17 | 80 | 19 | 84 | 23 | 94 | 18 | 87 | 18 | 98 | 24 | 80 | 37 | 95 | 27 |
| 300 | 85 | 16 | 52 | 23 | 87 | 25 | 90 | 18 | 83 | 16 | 95 | 23 | 79 | 36 | 90 | 28 |
| 500 | 83 | 18 | 44 | 26 | 50 | 20 | 87.6 | 19 | 74 | 19 | 93 | 24 | 74 | 39 | 86 | 30 |

The determinations carried out on the reaction products having the results reported in the table were performed according to the following rules:
1. Izod impact by engraving according to ASTM D 256–56
2. Rockwell hardness according to ASTM D 275–65
3. Bending modulus (E) according to ASTM D 790–66
4. Traction resistance according to ASTM D 638–68
5. Accelerated ageing at U.V. in Atlas DMC-R-weatherometer by employing a carbon double arc source
6. Yelloweness index - ASTM (D 1925) - 27
7. Grafting rate defined as $$\frac{(St = AN)^- \text{ g.}}{\text{rubber g}} \cdot 100$$

determind by extraction in Kumagawa under $N_2$ with acetone over 48 hours on the powder isolated from the reaction mixture.

What we claim is:

1. A polymeric material having high impact resistance and resistance to ageing consisting of a rubbery terpolymer of ethylene, an alpha-olefin and a triene termonomer containing at least one pair of conjugate double bonds in the polymer chain and having grafted thereon a member of the group consisting of alkenyl aromatic monomers, vinyl and vinylidene halides and acrylic monomers having the general formula $$CH_2 = \overset{R}{\underset{|}{C}} - X$$

in which R is hydrogen or an alkyl group having from 1 to 5 carbon atoms, and X is a member of the group consisting of $$-\overset{O}{\underset{\|}{C}}-OH; \quad -C\!\!=\!\!N; \quad -\overset{O}{\underset{\|}{C}}-NH_2$$

and $$-\overset{O}{\underset{\|}{C}}-OR'$$

wherein R' is an alkyl group having from 1 to 9 carbon atoms, and mixtures thereof.

2. A polymeric material as claimed in claim 1, wherein said rubbery terpolymer contains from 0.1 to 20 pairs of conjugate double bonds in the polymer chain.

3. A polymeric material as claimed in claim 1, wherein said alpha-olefin is polypropylene.

4. A polymeric material as claimed in claim 1, wherein said rubbery terpolymer has acrylonitrile and styrene grafted thereon.

* * * * *

UNITED STATES PATENT AND TRADEMARK OFFICE
CERTIFICATE OF CORRECTION

PATENT NO. : 3,966,844

DATED : June 29, 1976

INVENTOR(S) : Sergio Arrighetti, Aldo Brancaccio, Sebastiano Cesca and Gianpaolo Giuliani It is certified that error appears in the above-identified patent and that said Letters Patent are hereby corrected as shown below:

Column 1, line 40, Before "ageing" delete "an".

Column 3, lines 52-53, Correct spelling of "ethylene".

line 60, "[$\Gamma$]" should read --[$\eta$]--.

Column 5, lines 24 and 43, "[$\Gamma$]" should read --[$\eta$]--.

Column 6, line 17, "[$\Gamma$]" should read --[$\eta$]--.

line 17, After "1.8" insert --dl/g--.

line 31, Before closing parenthesis ")" correct spelling of "dienyl".

lines 37 and 56, "[$\Gamma$]" should read --[$\eta$]--.

Column 7, lines 4 and 24, "[$\Gamma$]" should read --[$\eta$]--.

Column 8, lines 9 and 33, "[$\Gamma$]" should read --[$\eta$]--.

line 16, After "under" insert --stirring--.

lines 17-19, Delete the formula.

UNITED STATES PATENT AND TRADEMARK OFFICE
CERTIFICATE OF CORRECTION

PATENT NO. : 3,966,844
DATED : June 29, 1976
INVENTOR(S) : Sergio Arrighetti, Aldo Brancaccio, Sebastiano Cesca, Gianpaolo Giuliani It is certified that error appears in the above-identified patent and that said Letters Patent are hereby corrected as shown below:

Table 1, Column entitled "Example" change "Izood-" to read --Izod- --.

Table 2, Second sentence change "Izood" to read --Izod--.

Column 9, line 16, Change equal sign (=) to plus sign --+--.

line 20, Correct spelling of "determined".

Signed and Sealed this

Fourteenth Day of June 1977

[SEAL]

Attest:

RUTH C. MASON
Attesting Officer

C. MARSHALL DANN
Commissioner of Patents and Trademarks